M. B. SCHAFFER.
BRAKE GEAR FOR RAILROAD CARS.
APPLICATION FILED MAY 5, 1911.
1,039,821.
Patented Oct. 1, 1912.
3 SHEETS—SHEET 1.
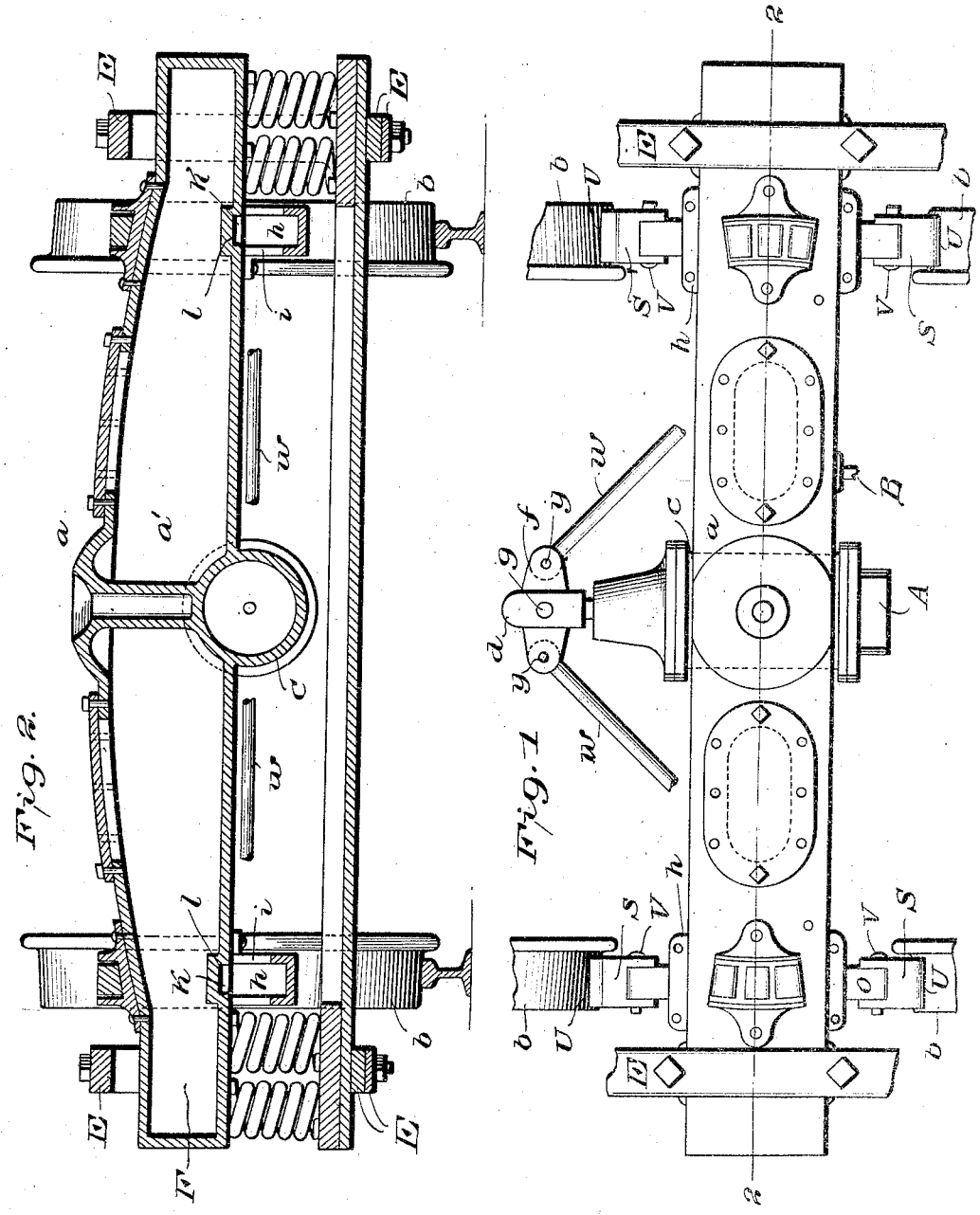

M. B. SCHAFFER.
BRAKE GEAR FOR RAILROAD CARS.
APPLICATION FILED MAY 5, 1911.
1,039,821.
Patented Oct. 1, 1912.
3 SHEETS—SHEET 2.
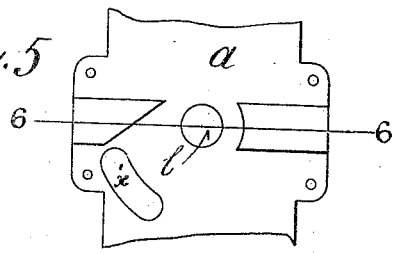
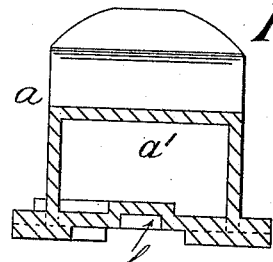
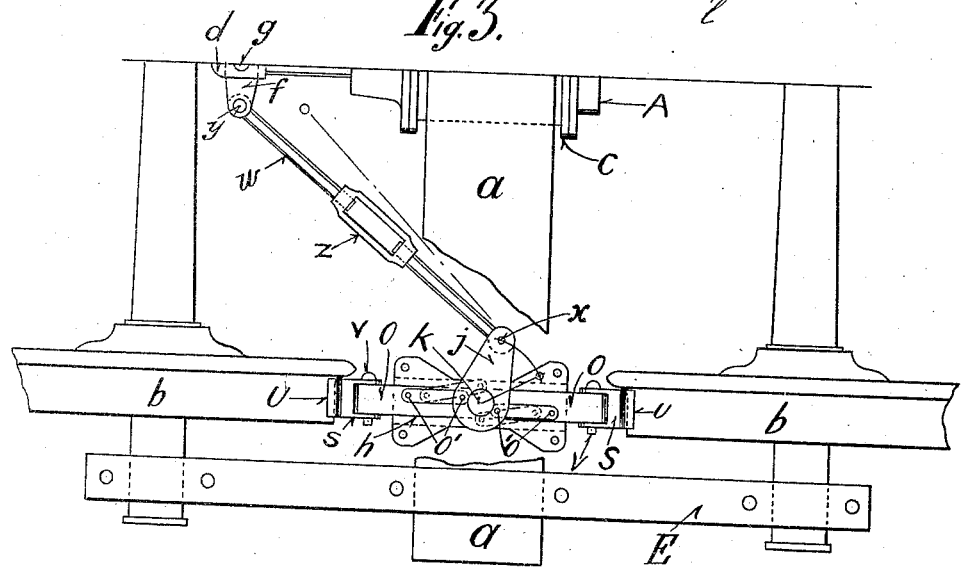
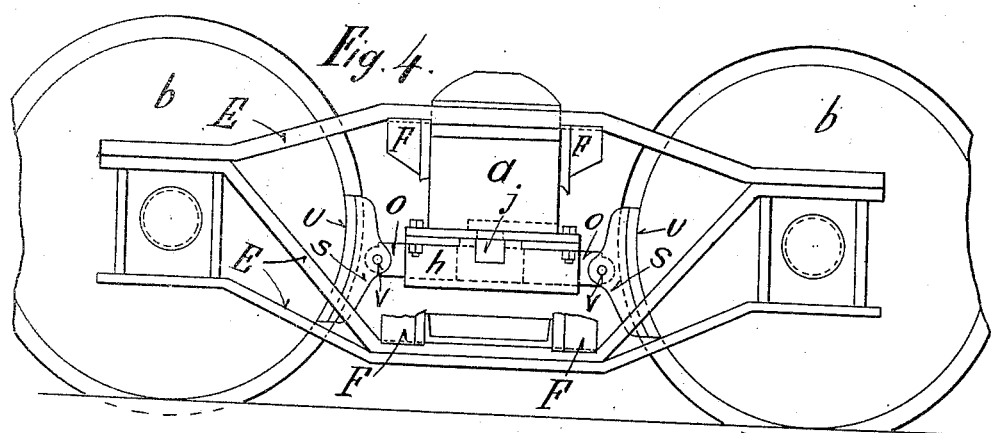
Witnesses
Inventor
Morse B. Schaffer
by F. R. Carmoael,
Attorney

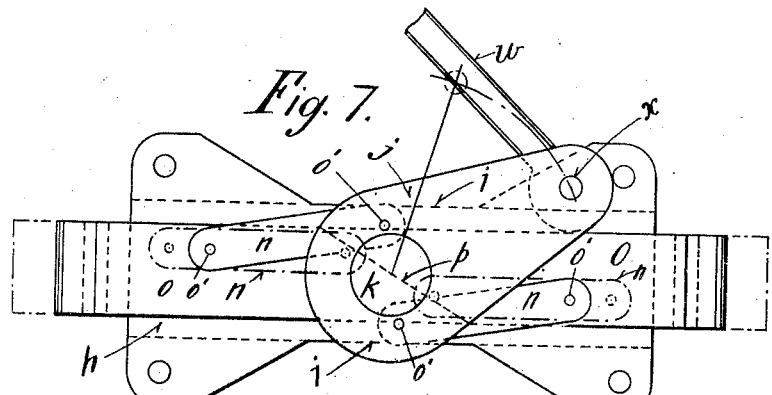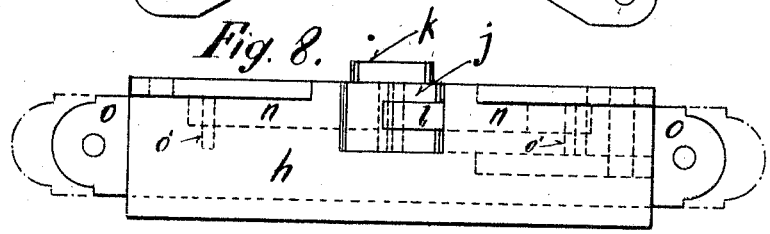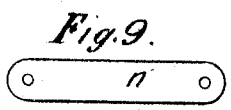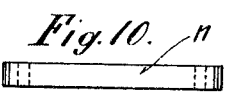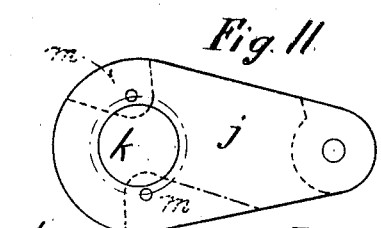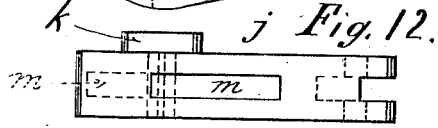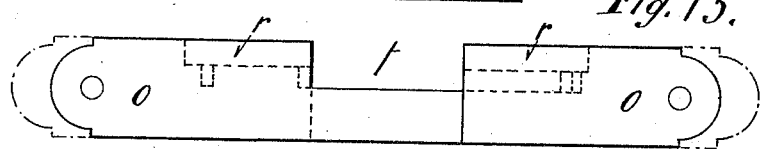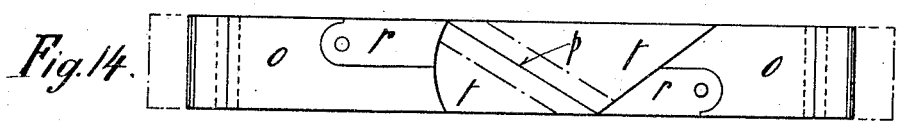

UNITED STATES PATENT OFFICE.

MORSE B. SCHAFFER, OF ST. LOUIS, MISSOURI, ASSIGNOR OF ONE-HALF TO CLARENCE H. HOWARD, OF ST. LOUIS, MISSOURI.

BRAKE-GEAR FOR RAILROAD-CARS.

1,039,821.

Specification of Letters Patent.

Patented Oct. 1, 1912.

Application filed May 5, 1911. Serial No. 625,277.

*To all whom it may concern:*

Be it known that I, MORSE B. SCHAFFER, a citizen of the United States, residing at St. Louis, Missouri, have invented a certain new and useful Improvement in Brake-Gear for Railroad-Cars, of which the following is a full, clear, and exact description, such as will enable others skilled in the art to which it appertains to make and use the same, reference being had to the accompanying drawings, forming part of this specification, in which—

Figure 1 is a top plan view of a car truck embodying my invention. Fig. 2 is a vertical longitudinal section taken on the line 2—2 of Fig. 1, omitting the brake-ram forming part of my invention. Fig. 3 is a half plan view of the truck (broken away) showing the brake-gear in top plan view. Fig. 4 is a side elevation of the truck (broken away) and a corresponding view of the brake-gear. Fig. 5 is an inverted plan to enlarged scale of the car truck-bolster (broken away) at the attachment thereto of part of the brake mechanism. Fig. 6 is a vertical transverse section thereof on line 6—6 of Fig. 5. Fig. 7 is a top plan view to enlarged scale, of part of the brake-gear detached from the bolster. Fig. 8 is a side elevation thereof. Fig. 9 is a plan view of one of the toggle-links forming part of my invention. Fig. 10 is an edge view of the link. Fig. 11 is a plan view of the brake lever. Fig. 12 is an edge view of the brake lever. Fig. 13 is a side elevation of the brake-rams seen in Figs. 7 and 8. Fig. 14 is a top plan view of said ram.

My invention relates to air brake-gear for railway cars, and has for its object the elimination of a large number of parts such as brake beams, brake rods, chains, levers and like appendages ordinarily used in brake gear, to generally simplify the construction of brake-gearing and to increase the efficiency of said gearing by arranging the parts so that the members carrying the brake shoes are in direct alinement with the car wheels, and thus the power transmitted to the brake shoe carrying member is directly imparted to the tread surfaces of the car wheels, and which arrangement overcomes any decrease or loss of power due to side strains at the time the brake shoes are applied.

In the drawings, $a$ represents the car truck-bolster in which is preferably formed the auxiliary air reservoir $a'$, and $b$ the wheels of the truck to which the brakes are applied. In the middle (or other suitable part) of the bolster $a$ and auxiliary air reservoir $a'$ is formed or fixed the air brake-cylinder $c$ having the push-rod $d$ which is operated by the piston $e$ movable in the cylinder $c$.

$f$ is an equalizing bar which is pivotally mounted in a slot in the push-rod $d$ by a bolt (or pin) $g$. Attached in any suitable manner to the bolster $a$ (or wall of the reservoir $a'$) on its underside at each side of the truck between two succeeding wheels $b$, and having its longitudinal center alined to the center of the brake bearing surfaces of the latter, is the brake-ram guide $h$ having openings $i$ at each side for permitting free play to the brake lever $j$.

On the top of the brake lever $j$ is formed a round boss or stud $k$ which is adapted to fit within a corresponding recess $l$ in the under side of the bolster $a$, thereby forming a pivot or fulcrum about which the brake-lever $j$ is adapted to move in a horizontal plane.

$m, m,$ are recesses in the lever $j$ for receiving and forming thrust bearings for one end of the toggle-links $n, n.$ $o, o,$ are brake-rams which are adapted to fit, and are movable longitudinally in alinement to each other in opposite directions within the guide $h$ to and from the transverse center of the same, their outer ends projecting beyond the guide $h$ and their inner meeting ends $p$ being preferably diagonal shaped as shown.

In the rams $o, o,$ are formed recesses $r, r,$ for receiving and forming thrust bearings for the other ends of the toggle-links $n, n.$ $u, u,$ are the brake-shoes which are pivotally attached to the outer ends of the brake-rams $o, o,$ by bolts (or pins) $v, v.$ $w$ are rods which are coupled at one end by pins $x$ to the other ends of the brake-levers $j$, and at their other ends by pins $y$ to the equalizing bar $f$, the connecting rods $w$ being preferably, adjustable lengthwise respectively, by a turnbuckle $z$ as shown.

$x'$ (Fig. 5) are recesses in the underside of the bolster $a$ for receiving the heads of the pins $x$. The toggle-links $n, n,$ are preferably connected at one end by pins $o'$ to the brake-levers $j$ on opposite sides of their fulcrums $k$ respectively, and at their other ends to the brake-rams o, o, whereby the latter with the brake-shoes u, u, are returned to their normal position and the shoes u, u, held out of contact with the weels b, but I do not confine myself to the use of the pins o' for this purpose.

In operation, the air in the brake cylinder c pressing on the piston e forces the push-rod d with the equalizing bar f outward, whereby the latter pulling on the connecting rods w partly rotates the brake-levers j about their fulcrums k and thereby cause the toggle-links n, n, to push the brake-rams o, o, outward in opposite directions and so press the brake-shoes u, u, against the wheels b.

Upon the release of the air pressure within the cylinder c, the piston e returns to its normal position, consequently bringing about a reverse movement of the parts f, w, j, n and o, which latter parts carry the brake shoes u, u, and thus the same are drawn away from the peripheries of the car wheels.

My improved brake gear is comparatively simple, does away with a large number of brake rods, chains and equalizing levers, and the rams carrying the brake shoes are arranged on the underside of the bolster in direct alinement with the car wheels, and for this reason great efficiency is obtained owing to the direct application of power against the tread surfaces of the car wheel.

It will be readily understood that minor changes in the size, form and construction of the various parts of my improved brake-gear may be made and substituted for those herein shown and described without departing from the spirit of my invention, the scope of which is set forth in the appended claims.

I claim:

1. In a car brake-gear of the class described, the combination with a car truck bolster, of a pair of rams arranged for movement on the underside of the bolster between the car wheels, brake shoes carried by the outer ends of said rams, a lever fulcrumed on the underside of the bolster for simultaneously imparting movement to said rams, and means whereby said lever is actuated.

2. In a car brake-gear of the class described, the combination with a truck bolster, of an air brake cylinder carried by said bolster, a member arranged for movement in said cylinder adapted to be actuated by air pressure in said cylinder, rams mounted on the under side of the bolster between the car wheels, brake shoes carried by the outer ends of said rams, and means for imparting simultaneous movement to said rams, which ram moving means is connected to and actuated by the member which is arranged for movement in the cylinder.

3. In a car brake-gear, the combination with a bolster, of a housing arranged on the underside thereof, a pair of rams arranged for operation in said housing between the car wheels, brake shoes carried by the outer ends of the rams for engagement with the tread surfaces of the car wheels, a lever fulcrumed in the housing, and members connecting said lever with the rams.

4. In a car brake-gear, the combination with a bolster, of a housing arranged on the underside thereof, a pair of rams arranged for operation in said housing between the car wheels, brake shoes carried by the outer ends of the rams for engagement with the tread surfaces of the car wheels, a lever fulcrumed in the housing, members connecting said lever with the rams, a brake cylinder on the bolster, a piston within the cylinder, a push rod carried by the piston, and connections between said push rod and the levers.

5. In a car brake-gear, the combination with a bolster, of a brake cylinder carried thereby, a pair of rams arranged for sliding movement between each pair of car wheels, brake shoes carried by the outer ends of said rams, and means operated directly by the air brake cylinder piston rod for imparting simultaneous movement to the rams.

6. In a car brake-gear of the class described, an equalizing bar operated directly by the air brake-cylinder piston rod, and mechanism in connection with the brake-shoes and the said bar and carried by the car bolster, for moving the said shoes into and out of engagement with the car wheels.

7. In car brake-gear of the class described, the combination with the car truck-bolster, of an auxiliary air reservoir, an air brake-cylinder adapted for communication with the said reservoir by a suitable air regulating valve, a piston movable in the cylinder, a piston rod attached to said piston, an equalizing bar connected to said rod, two opposite brake-shoes located between and adapted for engagement with two succeeding wheels of the truck at each side thereof, and a rod connecting the equalizing bar with mechanism carried by the said bolster and adapted for moving the shoes into and out of engagement with the wheels.

8. In car brake-gear of the class described, the combination with the car truck-bolster, of an auxiliary air reservoir, an air brake-cylinder adapted for communication with the said reservoir by a suitable air regulating valve, a piston movable in the cylinder, a piston-rod attached to the piston, an equalizing bar connected to the piston-rod, two brake-rams alined with each other between, and in the plane of two succeeding wheels at each side of the said truck, a guide for the rams which guide is fixed to the bolster, a brake-shoe attached to each of the rams, and a rod connecting the piston rod with mechanism carried by the said bolster and adapted for moving the said rams and shoes in opposite directions to and from the wheels.

9. In car brake-gear of the class described, the combination with the car truck-bolster, of an auxiliary air reservoir, an air brake-cylinder adapted for communication with said reservoir by a suitable air regulating valve, a piston movable in the cylinder, a rod attached to the piston, an equalizing bar pivoted to said rod, two brake-rams alined with each other between, and in the plane of two succeeding wheels at each side of the truck, a guide for the rams fixed to the bolster, a brake-shoe attached to each of the rams, a lever pivoted to the bolster, a link coupled to the lever at one side of its pivot and adapted to engage one of the rams, a link coupled to the lever at the opposite side of its pivot and adapted to engage one of the rams, a link coupled to the lever at the opposite side of its pivot and adapted to engage the other ram, and a rod connecting the lever with the piston rod.

10. In a car brake gear of the class described, the combination with a truck bolster provided with an air brake cylinder, of a pair of rams supported by and arranged beneath said bolster between the car wheels, brake shoes carried by the outer ends of said rams, a fulcrumed lever connected to the rams for simultaneously imparting movement thereto, a piston within the cylinder, a piston rod, and connections from said piston rod to the lever.

11. In an air brake gear of the class described, the combination with a truck bolster provided with an air brake cylinder, of brake shoes supported from the bolster for engaging with the car wheels, a piston within the air brake cylinder, a piston rod, and connections from said piston rod to the brake shoes for simultaneously moving the same into engagement with the car wheels and which connections include fulcrumed levers and toggle links pivotally connected thereto.

In testimony whereof I hereunto affix my signature in the presence of two witnesses, this second day of May, 1911.

MORSE B. SCHAFFER.

Witnesses:
C. T. WESTLAKE,
HAL C. BELLVILLE.

Copies of this patent may be obtained for five cents each, by addressing the "Commissioner of Patents, Washington, D. C."